Aug. 24, 1943.   J. M. HOTHERSALL   2,327,428
THREADING MACHINE
Filed Dec. 24, 1941   10 Sheets-Sheet 1

INVENTOR
John M. Hothersall
BY
ATTORNEY

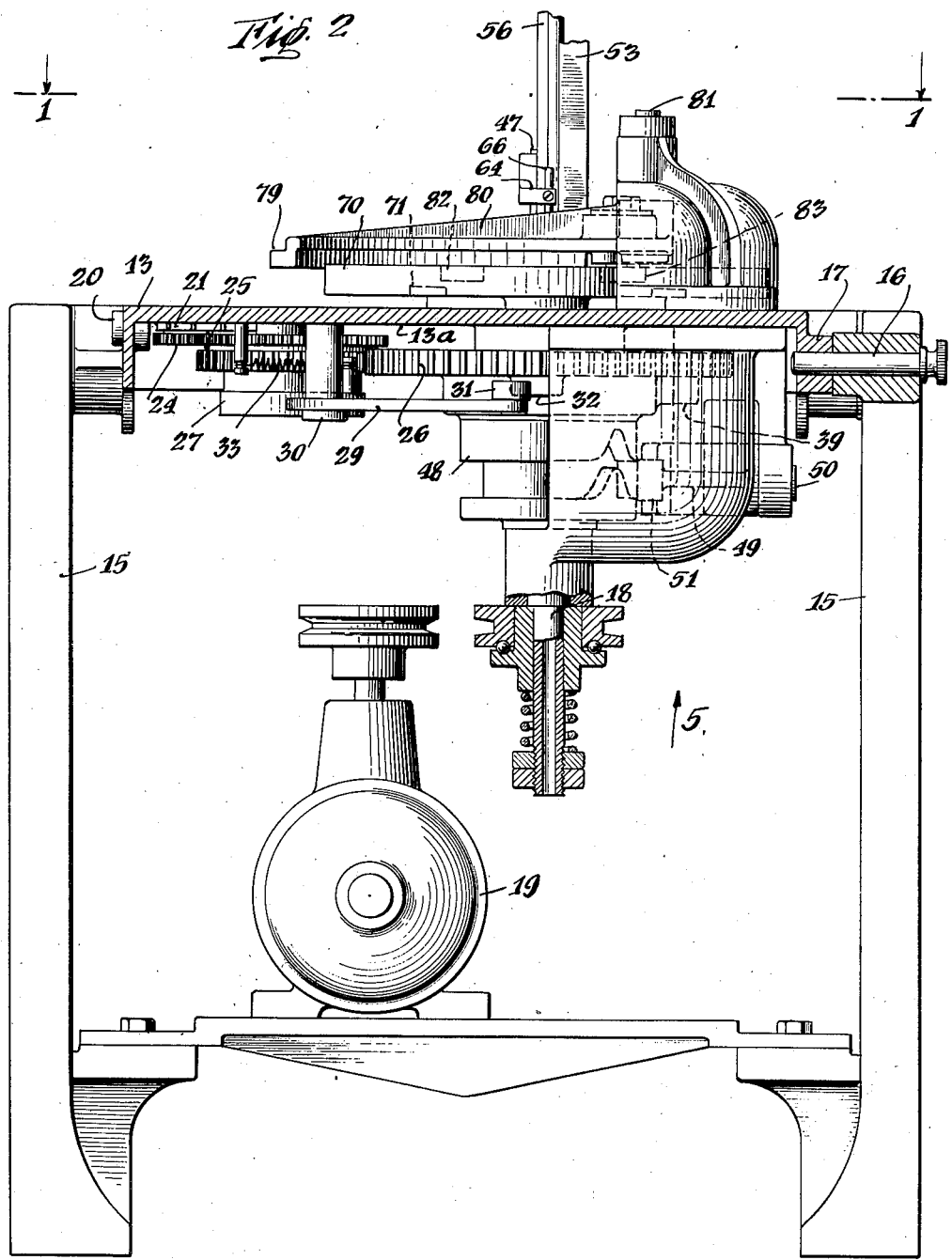

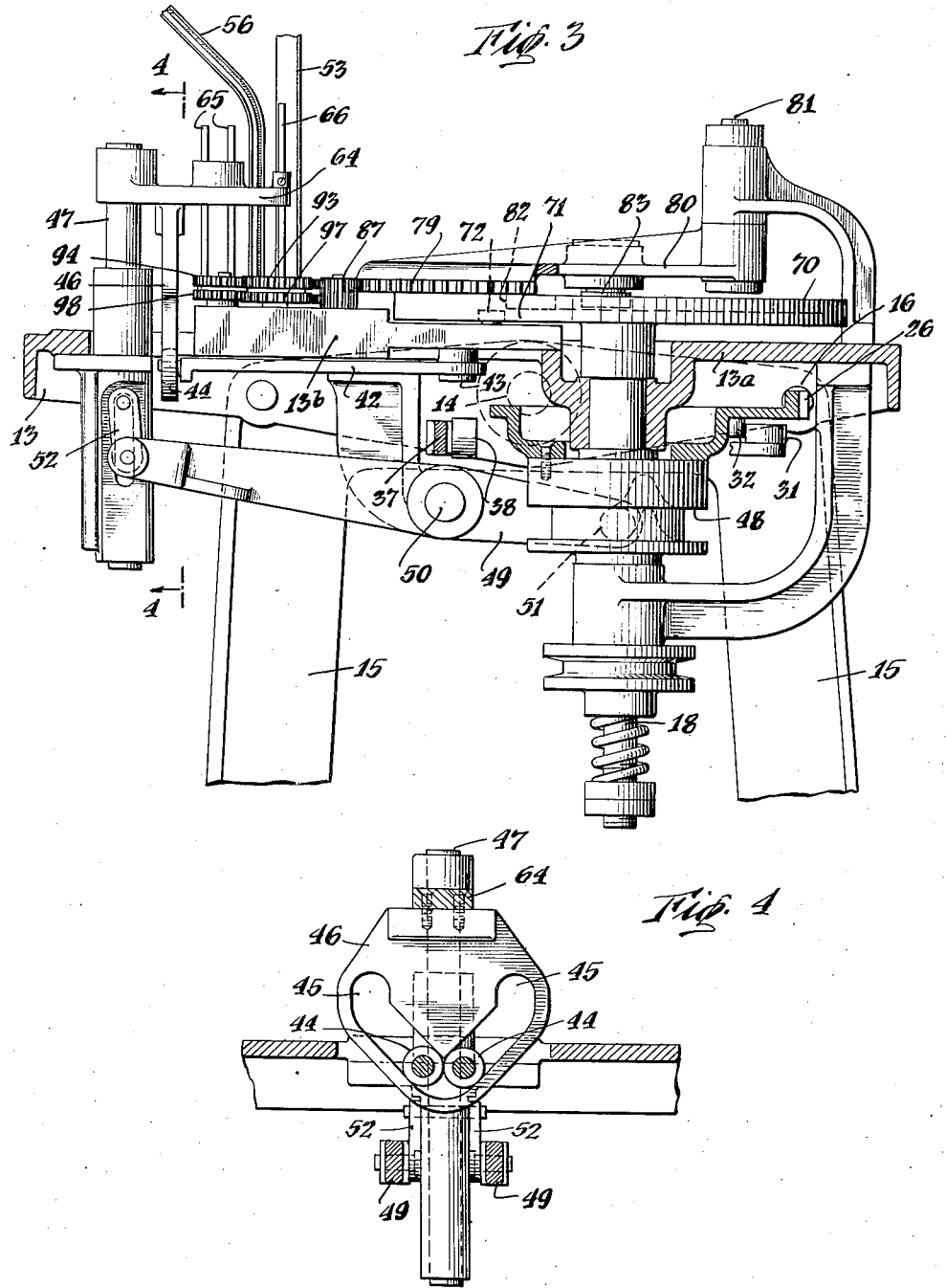

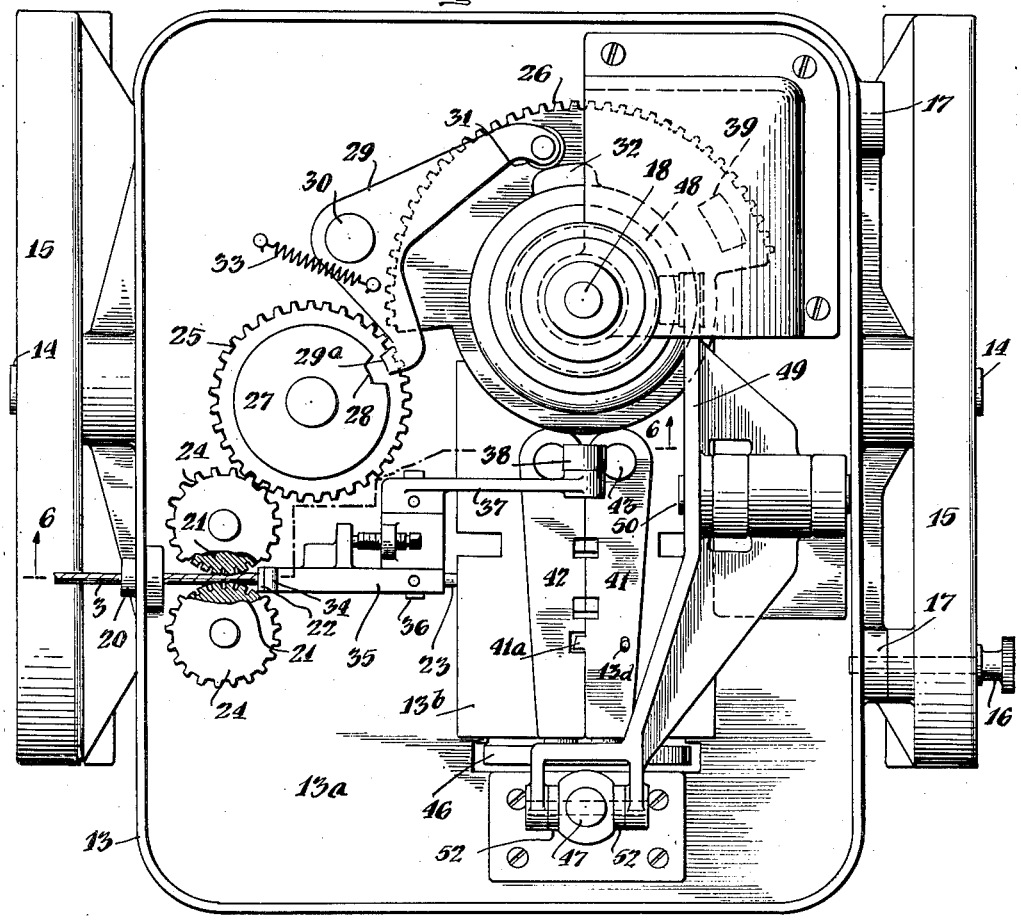

Aug. 24, 1943.     J. M. HOTHERSALL     2,327,428
THREADING MACHINE
Filed Dec. 24, 1941     10 Sheets-Sheet 5
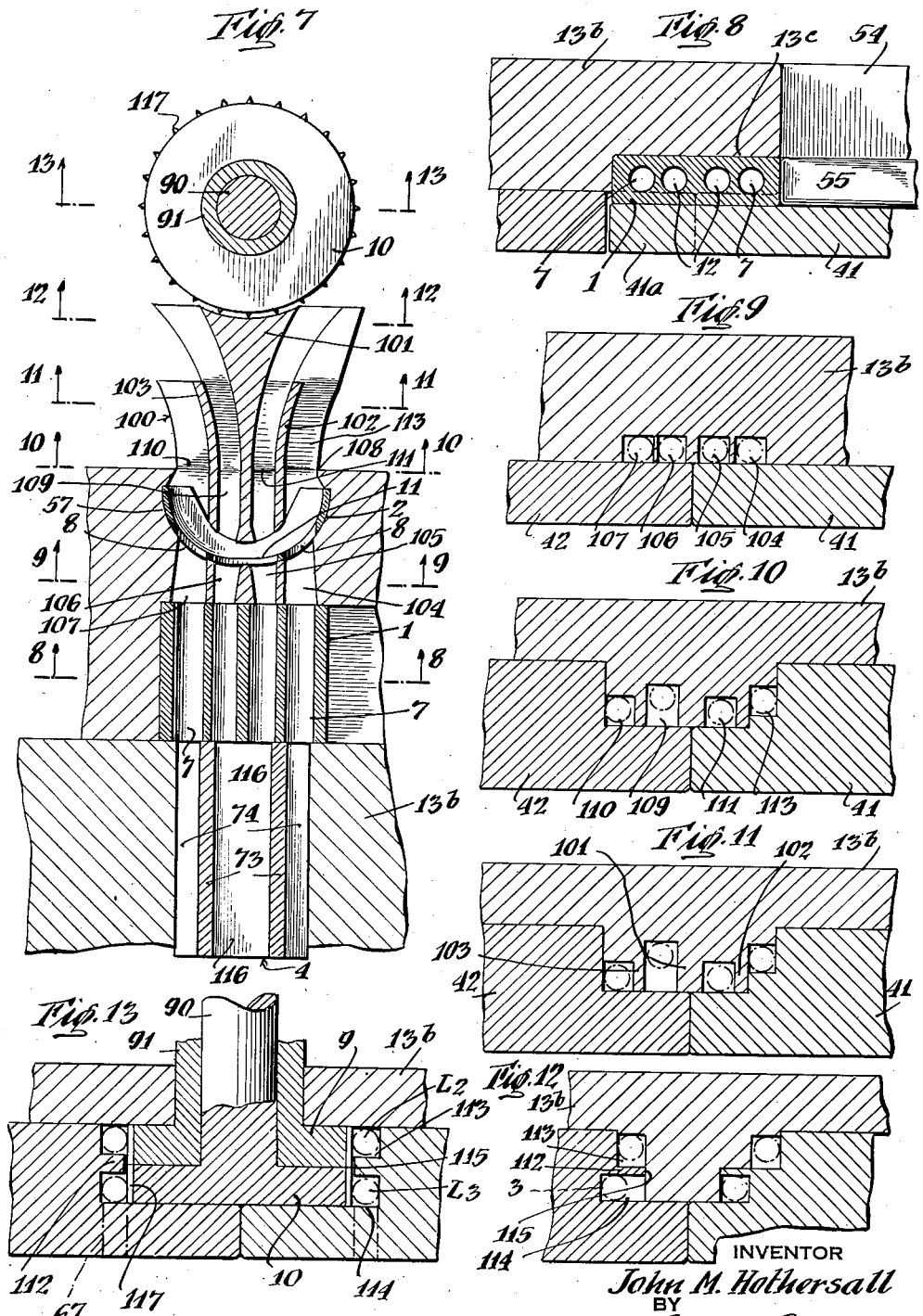
INVENTOR
John M. Hothersall
BY
ATTORNEY

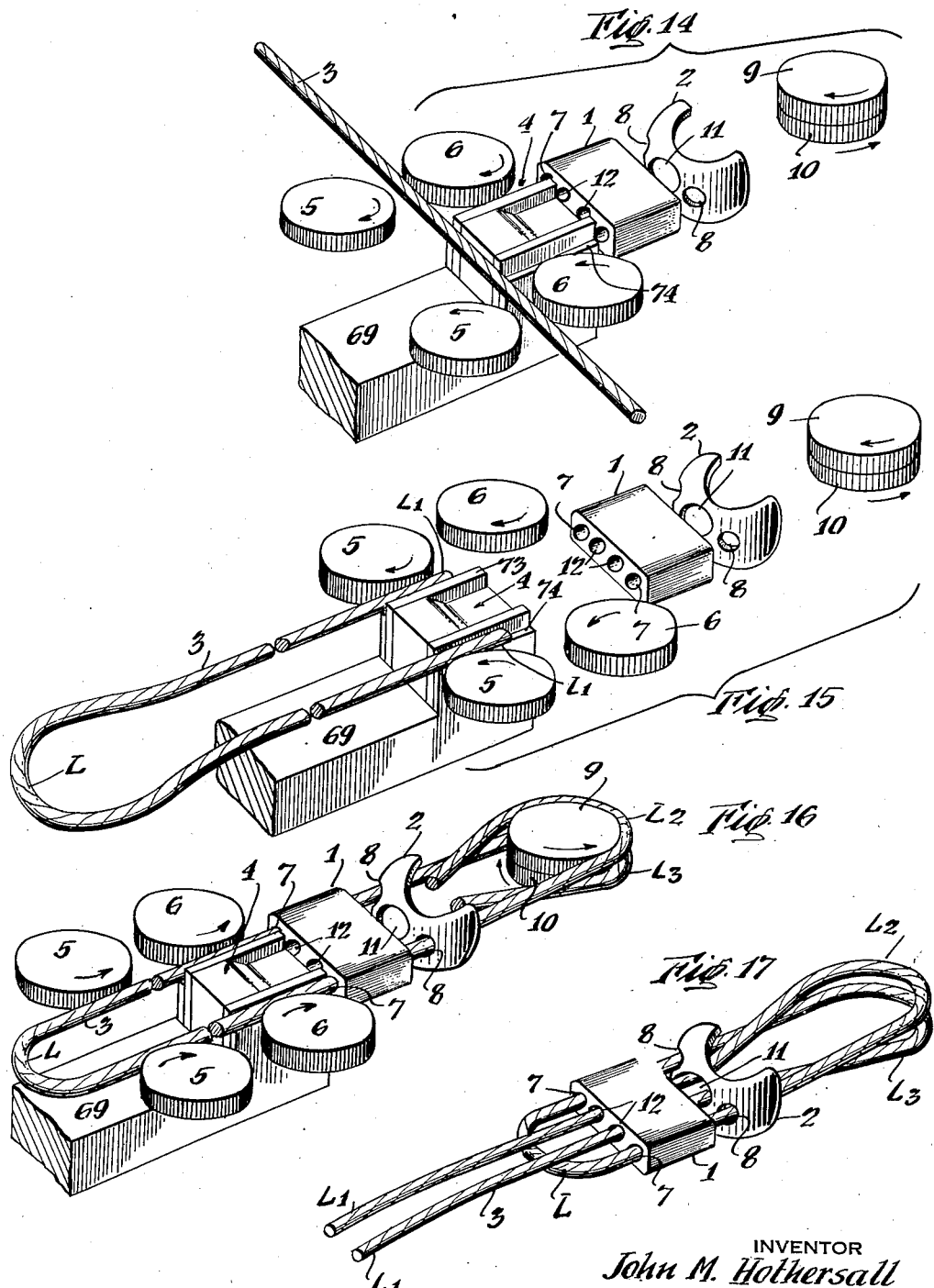

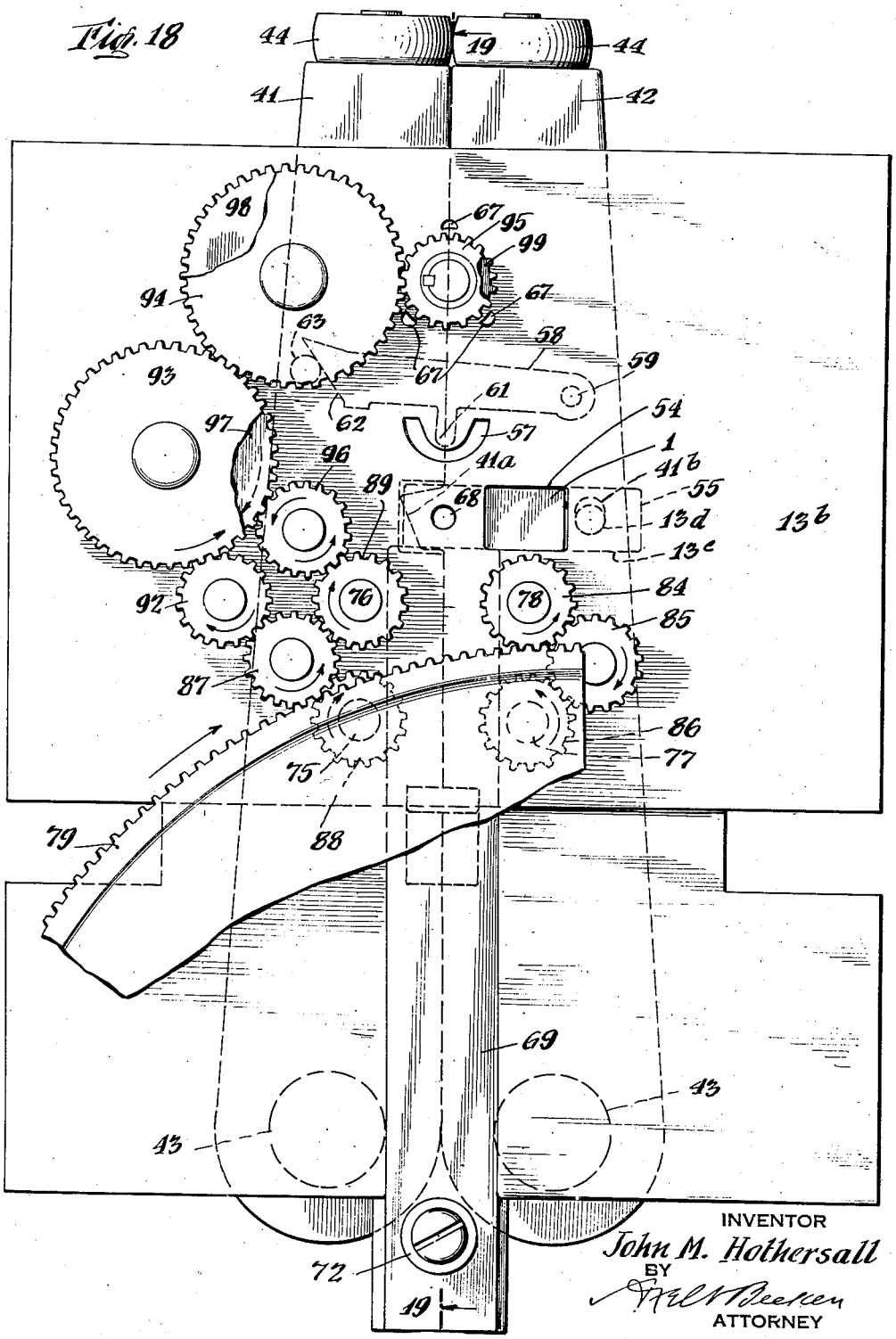

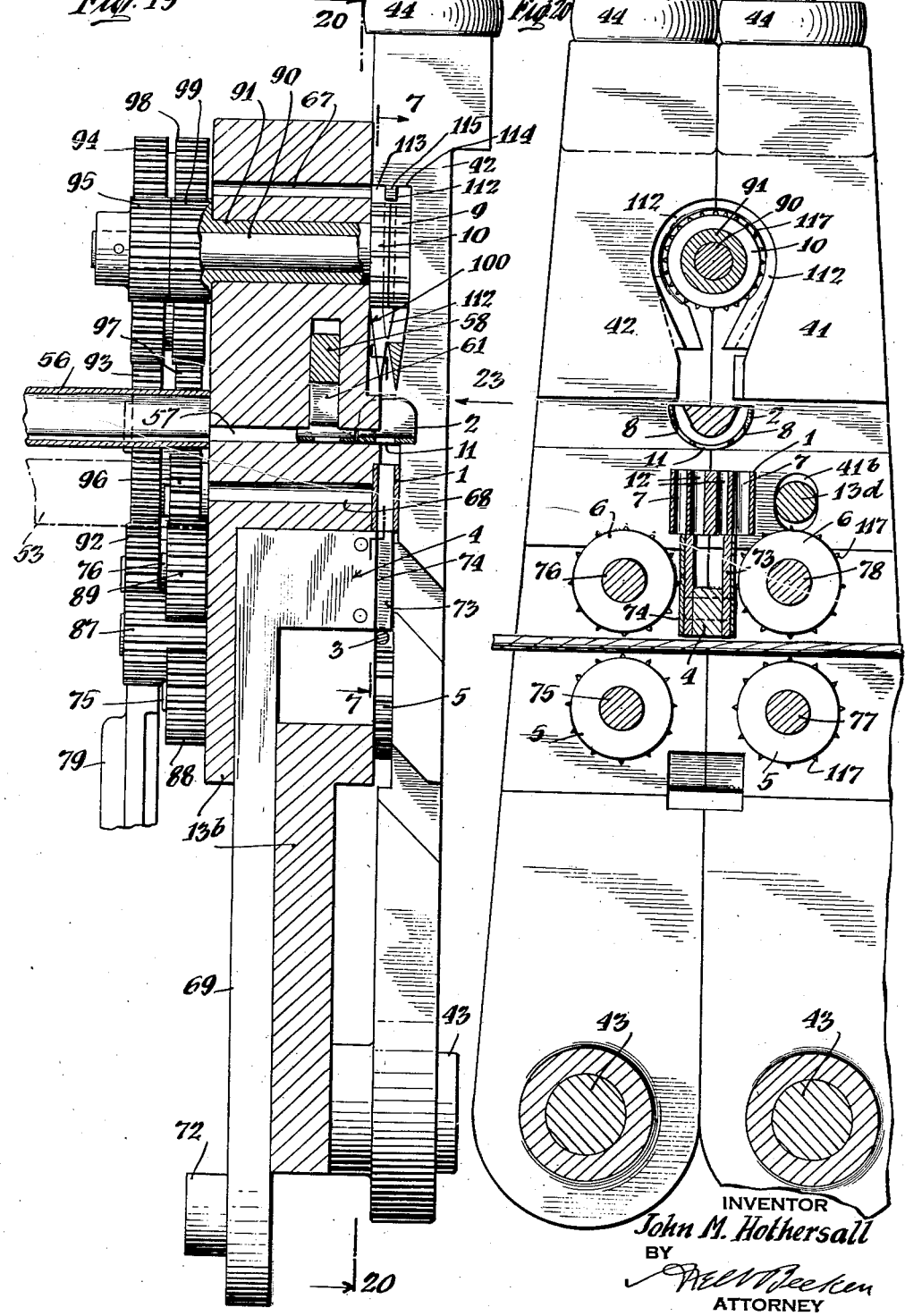

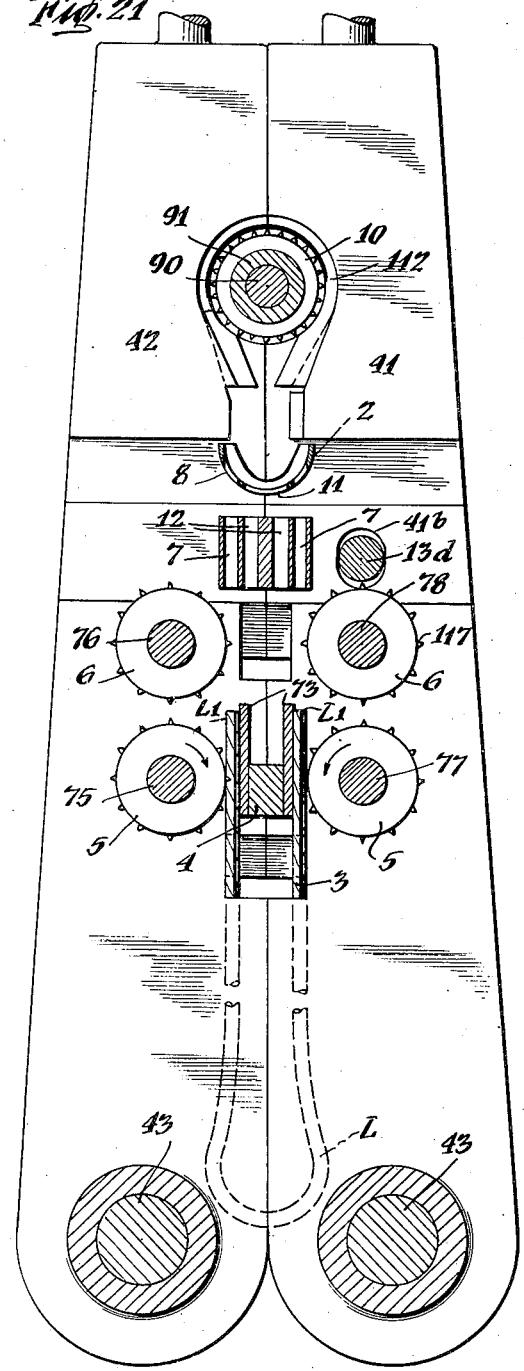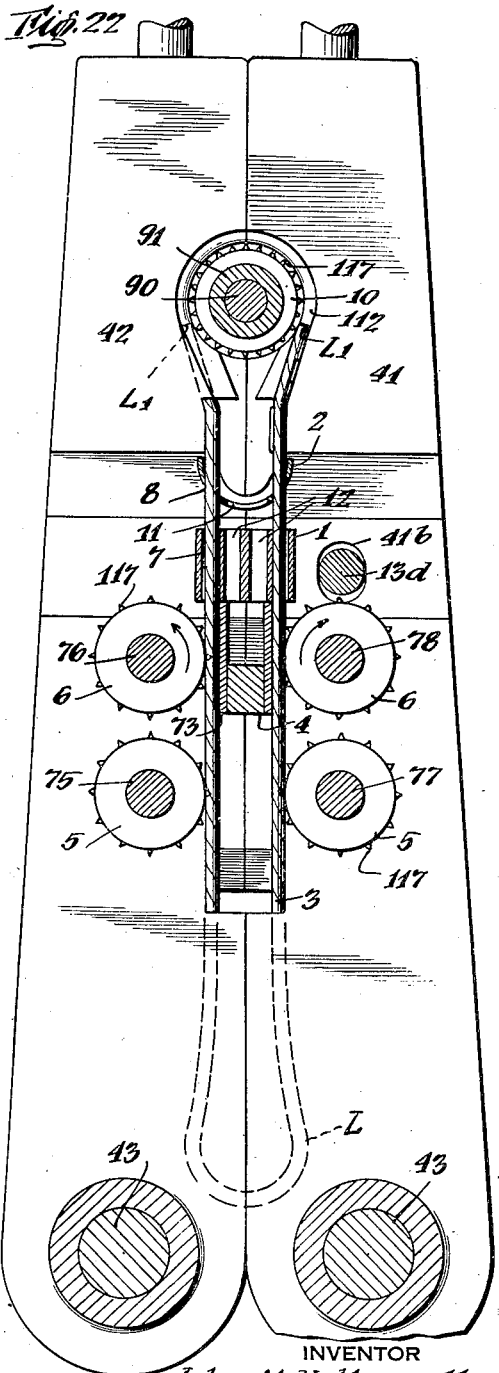

Aug. 24, 1943.     J. M. HOTHERSALL     2,327,428
THREADING MACHINE
Filed Dec. 24, 1941     10 Sheets-Sheet 10

INVENTOR
John M. Hothersall
BY
ATTORNEY

Patented Aug. 24, 1943

2,327,428

UNITED STATES PATENT OFFICE 2,327,428

THREADING MACHINE

John M. Hothersall, Brooklyn, N. Y., assignor to E. J. Brooks Company, Newark, N. J., a corporation of New Jersey Application December 24, 1941, Serial No. 424,375

13 Claims. (Cl. 29—84)

This invention relates to threading devices and has for its main object and feature the production of means for automatically threading a double strand into and reversely back through one or more sealing elements in a rapid and efficient manner.

In the accompanying drawings the invention is shown in a concrete and preferred form in which:

Fig. 2 is a vertical sectional view substantially on the plane of line 2—2 of Fig. 1;

Fig. 3 is a vertical sectional view substantially on the plane of line 3—3 of Fig. 1;

Fig. 4 is a vertical sectional detail view substantially on the plane of line 4—4 of Fig. 3;

Fig. 5 is a bottom plan view of the device as it would appear when the bed-plate is swung on its trunnions and is brought into an inverted position with its bottom uppermost; except for the fact that said bed-plate has been inverted, the view would be the same as one looking in the direction of arrow 5 of Fig. 2;

Fig. 6 is a vertical sectional detail view substantially on the plane of line 6—6 of Fig. 5;

Fig. 7 is a somewhat fragmentary sectional view substantially on the plane of line 7—7 of Fig. 19;

Figure 1:
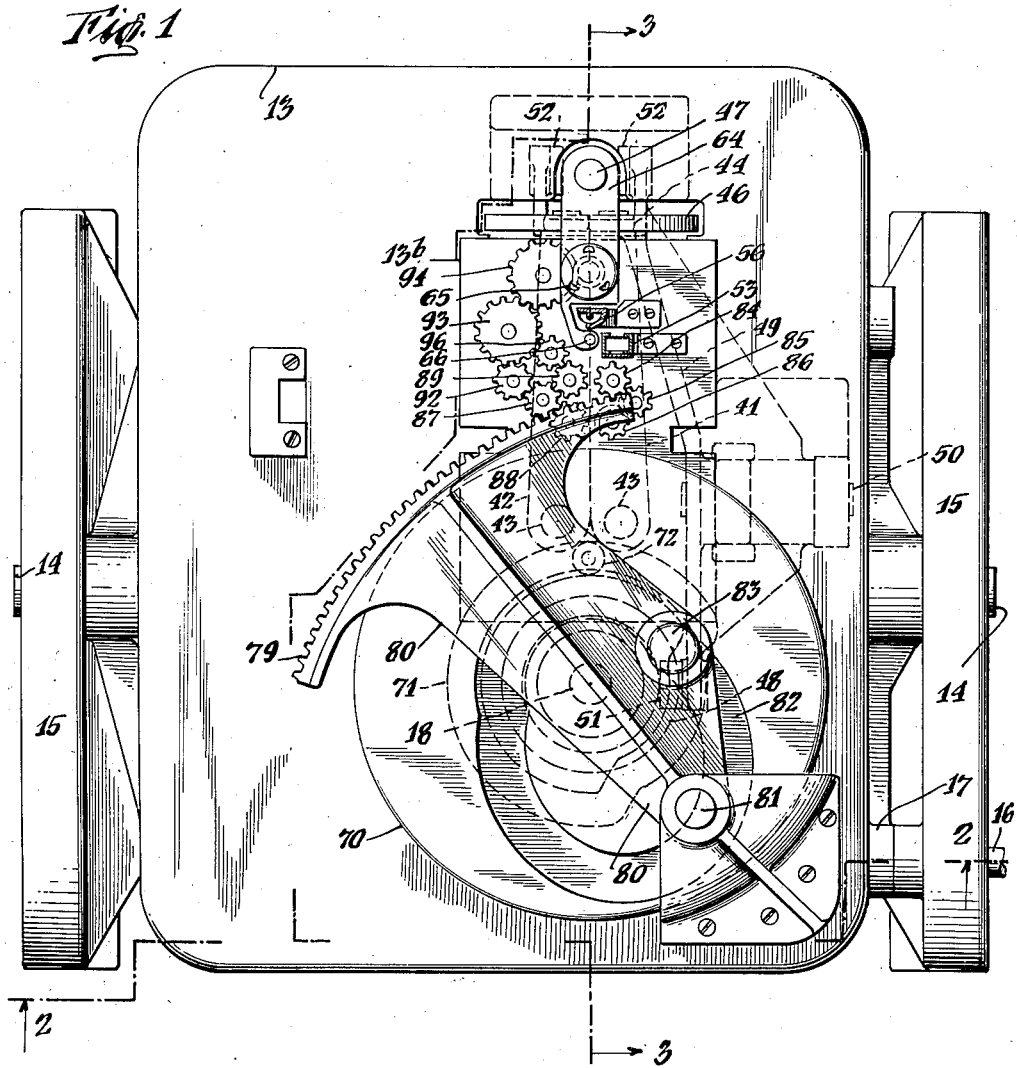
Fig. 1 is a top plan view of the device, partly in section, substantially on the plane of line 1—1 of Fig. 2.
Figure 23:
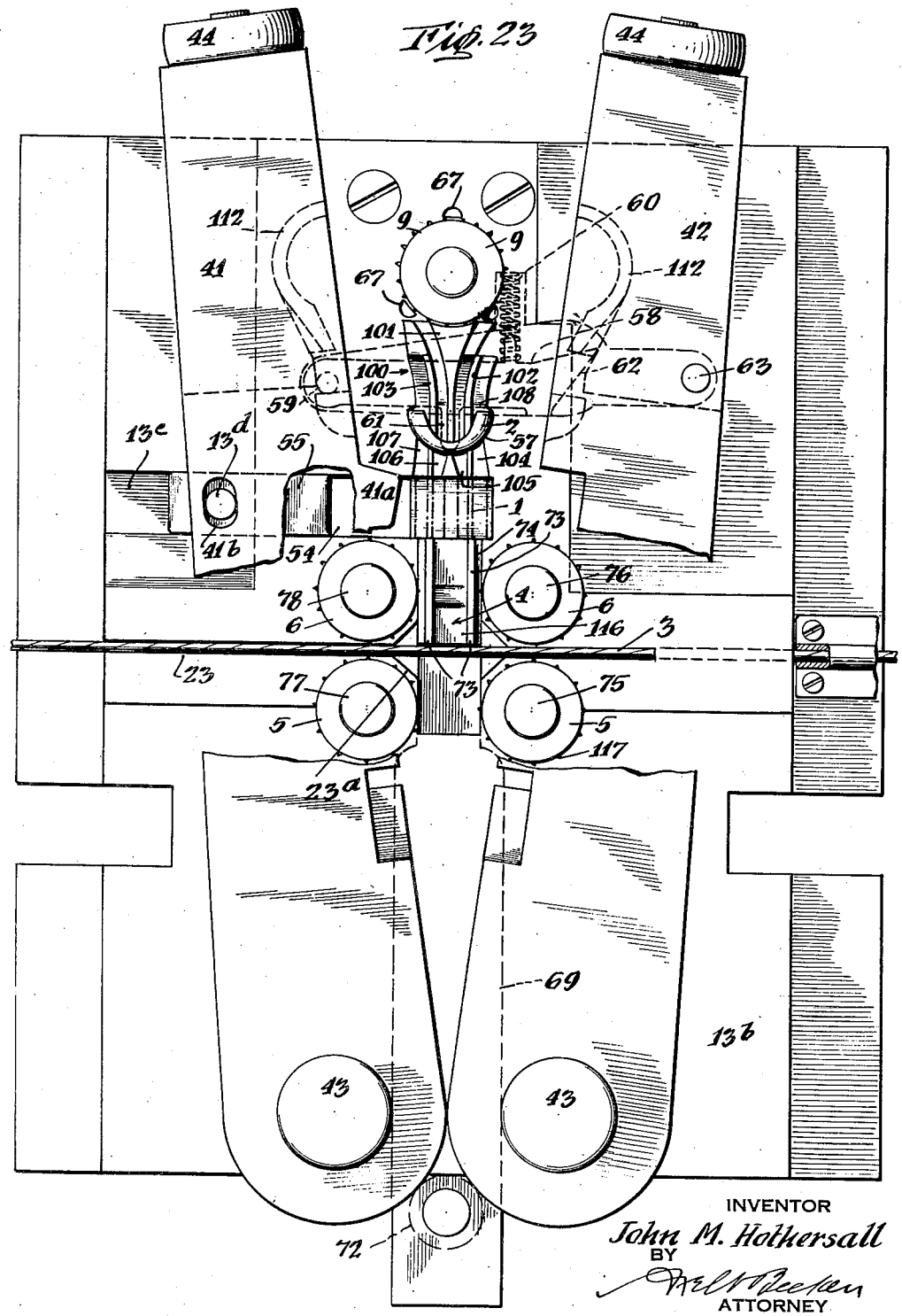

Figs. 8 to 13 inclusive are detail sectional views substantially on the plane of the correspondingly marked section lines of Fig. 7;

Figs. 14 to 17 inclusive are diagrammatic perspective views showing various stages in threading the strand through the seal and guard;

Fig. 18 is a top plan view of the gearing shown in Fig. 1 with certain parts omitted and broken away;

Fig. 19 is a sectional view substantially on the plane of line 19—19 of Fig. 18;

Fig. 20 is a sectional view substantially on the plane of line 20—20 of Fig. 19;

Figs. 21 and 22 are views substantially similar to Fig. 20 but showing the parts at different stages of operation; and Fig. 23 is a plan view looking substantially in the direction of arrow 23 of Fig. 19, with the supporting guides in open position, the seal being indicated in dotted lines, and the guard in full lines.

Attention is first directed to Fig. 17 which shows a sealing means such as is disclosed in U. S. Letters Patent No. 2,163,660 of June 27, 1939. The sealing means here consist of a perforated member 1 of compressible material such as lead, and a perforated so-called gripping and severing member or guard 2 of non-compressible material such as sheet steel, but, if desired, member 2 can be omitted. The strand, such as a flexible cord of fibrous material, is indicated at 3. In the art, as heretofore practiced, the threading of the strand through the sealing means has been accomplished manually, and the problem of performing the operation automatically is a long-standing one. The present invention solves this problem.

It will facilitate the explanation and understanding of the machine that is to be presently described if the major stages of operation are considered at this point, and for this purpose Figs. 14 to 17 inclusive will be utilized.

Sealing means 1 or 1 and 2 being placed in position in the machine, strand 3 is fed into the device (Fig. 14) in a direction at right angles to its subsequent movement. 4 indicates a reciprocatory member or carrier that engages the middle portion of the strand and by reason of a retrograde movement away from seal 1 causes said strand 3 to be brought into contact with feeding rollers 5, which latter at this time are rotating in the direction indicated by the arrows in Fig. 15, whereby the strand is formed into an open loop L or double strand with its free ends L' pointing toward seal 1. The direction of rotation of rollers 5 is now reversed and carrier 4 advances toward and up to seal 1 bringing the double strand into engagement with feeding rollers 6 that are rotating in the same direction as rollers 5. The free ends L' of the strand are thereby threaded through outer openings 7 of seal 1 and through outer openings 8 of guard 2. From thence one end of the strand passes around roller 9 and the other end of the strand passes around roller 10 (Fig. 16). Rollers 9 and 10 are coaxial and rotate in opposite directions so that the free ends of the strand are reversed to form two reverse loops L² and L³, after which the free ends are threaded back through center opening 11 of guard 2 and through the two inner openings 12 of seal 1. This completes the threading operation (Fig. 17), and the threaded seal assemblage is then discharged from the machine.

Having now obtained an understanding of what is accomplished by the invention, the mechanism utilized in carrying out the invention will be described.

The device as a whole (Figs. 1 to 6 inclusive) is carried by a bed-plate or main support 13 and, as operating parts are carried on both the upper and lower surfaces of said bed-plate, it is, in order to make all parts readily accessible for repair or adjustment, mounted to swing on trunnions or pivots 14 of framework 15 whereby either surface of said bed-plate can be brought uppermost. Suitable latching means, such as pin 16 that can be brought into bushings 17 of the bed-plate, serve to hold said bed-plate in either of its positions. 18 indicates a main-shaft from which the motion of the various parts is derived, and this shaft can be operated from any suitable source of power such as motor 19 by means of a belt or otherwise.

Strand 3 can be fed from any suitable source such as a reel (not shown) and is threaded adjacent underside 13a of bed-plate 13 (Figs. 5 and 6) through opening 20, between strand supply rollers 21, through guide 22, and into channel 23, and across between two sets of feed rollers 5 and 6 without being engaged by said rollers 5 and 6. Supply rollers 21 engage, and by their rotating movement feed, strand 3 across the path of movement of carrier 4, channel 23 being interrupted at 23a (see Fig. 23) to allow carrier 4 to pass. Channel 23 serves to sustain the strand across the path of movement of carrier 4 and between rollers 5 and 6. The supply rollers are driven intermittently by the following means: Supply rollers 21 carry intermeshing pinions 24, and one of these pinions meshes with a gear 25 which latter is intermittently turned by a gear sector 26 carried by rotatable shaft 18. Mounted to rotate with gear 25 is a disc 27 having a notch 28 and adapted to engage with said notch is one arm 29a of a bell-crank 29 pivotally supported at 30, the other arm of said bell-crank having a cam roll 31 to engage cam 32 mounted to rotate with shaft 18. A spring 33 tends to urge cam roll 31 against cam 32. It will now be apparent that rotation of shaft 18 will cause cam 32 to move arm 29a out of engagement with notch 28 thereby releasing gear 25 for rotation. Gear sector 26 now engages gear 25 rotating same and carrying notch 28 beyond the point where arm 29a can engage said notch when bell-crank 29 is released by cam 32. When gear 25 has made one complete revolution, gear sector 26 will disengage said gear 25 and arm 29a will again enter notch 28 under the influence of spring 33, thereby acting as an indexing mechanism, and gear 25 and supply rollers 21 will remain stationary during the remainder of the revolution of gear sector 26.

Suitable means are provided to sever a length of strand 3 from the source of supply. In the present instance, these means take the following form: 34 indicates a knife carried by lever 35 pivotally supported at 36 and having connected thereto a second arm 37 having a cam roll 38 to engage cam 39 conveniently carried by gear sector 26. A spring 40 tends to urge the knife out of severing position. The parts are so timed that when the strand comes to rest, after having been fed across the device, cam 39 engages cam roll 38 to actuate severing knife 34 against the tension of spring 40. It will be seen that severing of the strand takes place at a point between guide 22 and channel 23, so that a portion of the next length of strand is left between supply rollers 21 which latter at this time are not rotating.

Carried by bed-plate 13 is a supporting block 13b to the lower side of which two parallel arms or guide supports 41 and 42 are movably carried as by pivots at 43. Suitable means are provided to open and close said guide supports, that is to say, to move them toward and away from each other, into and out of contact. In the present instance, said guide supports are provided with cam rollers 44 that extend into cam slots 45 of a reciprocating cam 46 (Figs. 3, 4 and 5), which cam is carried by reciprocatory post 47 slidably mounted in the base-plate and actuated by cam 48, on shaft 18, by means of a lever 49. Said lever 49 is pivoted at 50 and carries at one end a cam roll 51 engaging cam 48 and is pivotally connected at its other end by means of links 52 to post 47. It will be apparent that, when cam 46 is in the position shown in Fig. 4, cam rollers 44 are close together and that therefore the guide supports are in their closed position, that is, in contact lengthwise, and that, when said cam 46 is moved down, the guide supports will be in their open position, that is: spread apart (Fig. 23). The guide supports, when in their closed position, sustain seal 1 and guard 2 (see for example Figs. 19 and 20) and, when separated, allow the threaded seal assemblage to be discharged. Suitable means are provided to automatically feed seal 1 and guard 2 into position on the guide supports which, in the present instance, take the following form: Mounted above supporting block 13b (see particularly Figs. 1, 3, 8, 18 and 23) is a hopper 53, containing a stack of seals 1, and this hopper is continued through a chute 54, in supporting block 13b, that extends the entire distance to the lower face thereof and to supporting guide 41 so that the lowermost seal 1 in the stack rests on an extension 41a of said supporting guide 41 when the supporting guides are in their open position. 55 indicates a feeding and cut-off member slidable in slot 13c of the supporting block and having a pin 13d extending into a slot 41b of supporting guide 41. Said member 55 is at one side of opening 54 when the supporting guides are in their open position and acts to push the lowermost seal 1 into threading position halfway across each supporting guide, when said supporting guides move into their closed position, and to cut off and support the remainder of the stack of seals. When the supporting guides again move into open position, another seal drops into position on extension 41a of supporting guide 41. Guards 2 are stacked in a hopper 56, mounted on supporting block 13b, that is continued by means of a chute 57 (Fig. 19) that extends clear through to the lower face thereof and to supporting guides 41 and 42, so that the lowermost guard 2 occupies a position straddling said supporting guides when the latter are in their closed position. 58 indicates a dog pivotally supported at 59 on supporting block 13b, and 60 is a spring, also on said supporting block, that tends to urge projection 61 of said dog into engagement with the next to the lowermost guard 2 in said opening 57. Dog 58 has a cam face 62 that engages a pin 63 on supporting guide 42 when said supporting guides are in their closed position to overcome tension of spring 60 and move projection 61 out of engagement with a guard member 2. It will now be seen that, when the supporting guides move into their closed position, dog 58 will permit the stack of guards 2 to drop a distance equal to the height of a guard 2, thereby placing the lowermost of said guards on the supporting guides, and that, when said supporting guides are in their open position, said dog 58 will hold the then lowermost guard 2 and thereby the whole stack of guards. Thus the feeding of both seal 1 and guard 2 is controlled by the opening and closing movement of said supporting guides 41 and 42. The opening movement of said supporting guides will also tend to discharge the threaded seal assemblage out of the machine but, if desired, ejecting means can be employed which, here, take the following form: Carried by post 47 is a bracket 64, which not only supports cam 46 but also ejectors 65 and 66. Ejector 65 consists here of a group of three rods that descend through openings 67, and ejector 66 is a single rod that descends through opening 68, in supporting block 13b when cam 46 descends to open the supporting guides, said rods striking different parts of the threaded seal assemblage to make sure of its removal from the operating parts of the machine.

It now being understood how the strand of flexible material 3 as well as seal 1 and guard 2 are introduced into, and how the threaded seal assemblage is removed from, the machine, I shall proceed to a description of the threading mechanism.

A suitable loop-forming and threading mechanism including feeding and guiding means is located adjacent one end of the seal in position to be threaded. These means have already been alluded to and consist here, generally, of reciprocatory carrier 4 and two sets of feeding rollers 5 and 6. Reciprocatory carrier 4 is mounted on a slide 69 guided in supporting block 13b above supporting guides 41 and 42. (See particularly Figs. 3, 14, 15, 16, 18, 19, 20 and 23. Note well that Figs. 14, 15 and 16 are diagrammatic views in perspective looking from the bottom of the device in an upward direction.) Slide 69 is actuated by any suitable means such as double-face cam 70 on shaft 18, with one cam face 71 of which cam roll 72 engages, said cam roll being carried by slide 69. Carrier 4 is provided with two upstanding division walls 73 and outer ledges 74, the latter in alinement with openings 7 of the seal, and reciprocates between the members of two sets of rollers 5 and 6. Said rollers 5 and 6 are mounted on shafts 75, 76, 77 and 78 carried by supporting block 13b and suitable gearing is provided for rotating them first in one direction and then in the other. As here shown, the gearing used in the present instance is as follows: 79 indicates a gear sector mounted on an arm 80 that oscillates on shaft 81, the oscillating movement being conveniently derived from cam face 82, of double-face cam 70, by means of cam roll 83. Gear sector 79 engages with the upper half of a double-width pinion 84 on shaft 78, which in turn has its lower half in mesh with an intermediate pinion 85 that engages pinion 86 on shaft 77. Gear sector 79 also engages the upper half of a second double-width pinion 87, which is an intermediate pinion, the lower half of which drives pinions 88 and 89 on shafts 75 and 76. As shown, shafts 75, 76, 77 and 78 extend clear through supporting block 13b and carry the pinions described above, and the feed rollers 5 and 6 below, said supporting block. Gear sector 79 is in constant mesh with pinions 84 and 87 and by its oscillating movement turns said pinions and thus the entire train of gears connected therewith alternately in opposite directions. Rollers 5 and 6 are located in the same plane as strand 3, as is carrier 4. At the beginning of the looping and threading operation, carrier 4 occupies the position indicated in Figs. 14, 19 and 20, that is, between strand 3 and seal 1, and said strand extends between rollers 5 and 6 but is not in engagement with said rollers. Carrier 4 now begins its retrograde movement, that is, in a direction away from seal 1. The retrograde movement of carrier 4 pushes strand 3 into the beginning of a loop and brings portions of said strand between division or guide walls 73 and rollers 5, said portions resting on ledges 74. Rollers 5 are at this time rotating in the direction of the arrows in Fig. 15 and, by their action on strand 3 against division walls 73 as guides, feed the entire strand into loop L with the free ends L' pointing toward the seal (Figs. 15 and 21). Carrier 4, after pausing, reverses its movement and advances until it comes in abutting contact with the seal and with ledges 74 in alinement with openings 7 of the seal, after which said carrier pauses. Rollers 5 and 6 are now rotating in a direction the reverse of that previously existing, and free ends L' are therefore threaded through openings 7 of the seal and openings 8 of guard 2 by the coaction of rollers 6 and division or guide walls 73 of carrier 4 and this feeding movement continues during the operation of reversing and rethreading the strand back through the guard and seal (Figs. 16 and 22), an operation to be presently described.

A reversing and rethreading device is located adjacent the other end of seal 1 from that at which the loop-forming and threading device is located and, in case a second sealing member such as guard 2 is also to be threaded, at a place beyond the point where said guard is supported. Reversing rollers 9 and 10, that, in association with guiding means hereinafter referred to, act to feed and reverse free ends L' of loop L and to create reverse loops $L^2$ and $L^3$ of strand 3, are located in superposed and coaxial relation, and one of said rollers rotates in one direction while, at the same time, the other roller rotates in the opposite direction. Reference will now particularly be made to Figs. 7 to 16 inclusive, 18, 19, 20, 21 and 22. Reversing roller 10 is mounted on an inner shaft 90 and reversing roller 9 is mounted on a sleeve shaft 91, both of said shafts being suitably supported in supporting block 13b. Motion for driving shafts 90 and 91 is conveniently derived from gear sector 79 by way of double-width pinion 87 as follows: The upper half of double-width pinion 87 meshes with a pinion 92 that drives gear 93 meshing with another gear 94 which latter, in turn, drives pinion 95 on shaft 90. The lower half of double-width pinion 87, as previously described, meshes with pinion 89 on shaft 76, and said pinion 89 drives pinion 96, which latter drives gear 97 (coaxial with gear 93 but mounted to rotate independently thereof), and said gear 97 drives gear 98 (coaxial with gear 94 but mounted to rotate independently thereof), which gear 98 drives pinion 99 on sleeve shaft 91. From the foregoing it will appear that, by reason of the interposition of an additional intermediate pinion 96 in one of the two trains of gears described, rollers 9 and 10 will rotate simultaneously in directions opposite to each other. It has been pointed out previously that gear sector 79 has an oscillating motion so that rollers 5 will be driven first in one direction and then in the other. The same is, of course, true of rollers 9 and 10 but, as said rollers 9 and 10 only act on the strand during a part of the cycle of the machine and always during the same part of said cycle, their direction of rotation will always be correct during the period they are engaging the strand. Supporting block 13b is provided, intermediate the point where seal 1 is located and rollers 9 and 10 are situated, with a guide section indicated generally by the reference character 100. This guide section has a main separating or guiding wall 101 and two subsidiary separating or guiding walls 102 and 103, and all three walls are intersected by opening 57 through which guards 2 are fed. The walls aforesaid form four guideways 104, 105, 106 and 107, two of which, 104 and 107, are in line with openings 7 of seal 1 and with openings 8 of guard 2, and the other two of which, 105 and 106, are in line with openings 12 of seal 1 and opening 11 of guard 2. Guideway 104 curves outwardly and is inclined upwardly (as viewed in Fig. 10) at point 108 so as to bring one free end L' of the strand loop from the plane of one of openings 8 of guard 2 into the plane of roller 9, and guideway 106 curves inwardly and is inclined downwardly (as viewed in Fig. 10) at point 109 from the plane of roller 9 to the plane of opening 11 of guard 2. Guideway 107, at point 110, curves outwardly and is inclined downwardly (as viewed in Fig. 10) from the plane of the other opening 8 in guard 2 so as to bring the other free end L' of the strand loop into the plane of roller 10, and guideway 105 curves inwardly and is inclined upwardly, at point 111 (as viewed in Fig. 10) from the plane of roller 10 to that of opening 11 of guard 2. Guide supports 41 and 42 are provided with semi-circular faces 112, adjacent rollers 9 and 10, having (as viewed in Figs. 12 and 13) upper and lower segmental-shape guideways 113 and 114, separated by an intervening ledge 115, that direct one free end L' of the strand loop from guideway 104, around roller 9, back to guideway 106, and the other free end L' of the strand loop from guideway 107, around roller 10, back to guideway 105. One free end L' of the loop strand therefore passes from one opening 7 of seal 1 through guideway 104, one opening 8 of guard 2, over incline 108, through guideway 113 around roller 9, over incline 109, through opening 11 of guard 2, through guideway 106, through one of the openings 12 of seal 1 and into the center compartment 116 of reciprocatory carrier 4. At the same time, the other free end L' of the loop strand passes from the other opening 7 of seal 1 through guideway 107, the other opening 8 of guard 2, over inclined 110, through guideway 114 around roller 10, over incline 111, through opening 11 of guard 2, through guideway 105, through the other opening 12 of seal 1 and into the center compartment 116 of reciprocatory carrier 4. The feeding of the loop strand to effect the reversing and rethreading thereof is accomplished by rotation of rollers 9 and 10, but it will be understood that rollers 6 also continue to feed said strand, first, so that the free ends of the strand loop may reach said rollers 9 and 10 and, later, to assist said rollers 9 and 10 to propel said free ends. Rollers 6, 9 and 10, as well as rollers 5 and 21, are provided with spikes or teeth as indicated at 117 that engage and advance the strand.

The general operation of the device is as follows:

Strand 3 of flexible material is fed into the machine by means of rollers 21 and, as supporting guides 41 and 42 move into engagement, seal 1 and guard 2 are brought into threading position. Carrier 4 moves rearwardly away from the seal and brings the strand into the bite of rollers 5 which act to form said strand into an open loop L. Carrier 4 reverses its motion and moves toward the seal and, by means of rollers 5 and 6, whose direction of rotation has been reversed, the free ends L' are threaded through the seal and guard. The free ends L' of the loop are now brought into engagement with rollers 9 and 10, reverse loops L² and L³ are formed and free ends L' now return and are rethreaded through the guard and seal. Supporting guides 41 and 42 move into open position and ejectors 65 and 66 descend and eject the threaded seal assemblage.

I claim:

1. In a threading machine, means to support a perforated sealing member through which a looped double-end strand is to be threaded and rethreaded, feeding and guiding means, arranged adjacent one end of said sealing member when in threading position, to thread the free ends of the looped strand through said sealing member, and a combined reversing and rethreading device, arranged adjacent the other end of said sealing member, including feeding and guiding means to reverse the direction of travel of said free ends of the threaded strand to thereby form two reverse loops the free ends of which point back toward the sealing member and to rethread said free ends through the perforated sealing member.

2. In a threading machine, means to support a perforated sealing member through which a double-end strand is to be threaded and rethreaded, means to sustain a strand of flexible material transversely of the sealing member, a combined loop-forming and threading device, arranged adjacent one end of said sealing member when in threading position, including feeding and guiding means to convert the strand of flexible material into a U-shape loop with its free ends pointing toward the sealing member and to move said looped strand to thread said free ends through the perforated sealing member, and a combined reversing and rethreading device, arranged adjacent the other end of said sealing member, including feeding and guiding means to reverse the direction of travel of said free ends of the threaded strand to thereby form two reverse loops the free ends of which point back toward the sealing member and to rethread said free ends through the perforated sealing member.

3. In a threading machine, means to support a perforated sealing member through which a double-end strand is to be threaded, a reciprocatory carrier, having a path of movement toward and away from said sealing member, provided with supporting ledges, in alinement with perforations of the sealing member, and with upstanding guide walls, two spaced apart sets of feed rollers the members of both of which are arranged at opposite sides of the path of movement of said carrier, means to sustain a strand of flexible material intermediate the two sets of rollers and across the path of movement of said carrier, means to move said carrier from a position adjacent the sealing member toward the strand to bring the strand between the members of one set of feeding rollers, while they rotate in a direction to move the strand away from the sealing member, and the upstanding walls of the carrier to thereby feed the strand into a loop the free ends of which rest on the ledges aforesaid and point toward the sealing member, and to thereafter move said carrier toward the sealing member and between the members of the other set of feeding rollers while the members of both sets of feeding rollers rotate in a direction to move the free ends of the loop toward the sealing member, and transmission means to rotate the members of the one set of feeding rollers first in one and then in the other direction, and to rotate the members of the other set of feeding rollers to move the free ends of the strand through the perforated sealing member.

4. In a threading machine, means to support a perforated sealing member through which a looped double-end strand is to be threaded and rethreaded, feeding and guiding means, arranged adjacent one end of said sealing member when in threading position, to thread the free ends of the looped strand through said sealing member, and a combined reversing and rethreading device, arranged adjacent the other end of said sealing member, including two coaxially arranged reversing rollers, means to simultaneously rotate said reversing rollers in opposite directions with respect to each other, guiding means having two superimposed curved guideways surrounding said reversing rollers, one at the level of one and the other at the level of the other of said reversing rollers, and inclined guides to direct one free end of the threaded strand from the sealing member in one direction into one of said guideways and back through the perforated sealing member and the other of said free ends of the threaded strand from the sealing member in the other direction into the other of said guideways and back through the perforated sealing member.

5. In a threading machine, a supporting block, a pair of arms, arranged alongside of each other adjacent the lower face of said supporting block, to support on their upper faces a perforated sealing member through which the free ends of a looped strand are to be threaded and rethreaded, means to move said arms into and out of sidewise contact with each other, guiding and feeding means carried on the lower face of said block to thread the free ends of the looped strand through the perforated sealing member, feeding means to reverse the direction of the free ends of the threaded strand also carried by the block at its lower face, and segmental-shape guides carried by the arms to direct the free ends of the threaded strand in opposite and reverse directions back toward the perforated sealing member.

6. In a threading machine, a supporting block, a pair of arms, arranged alongside of each other adjacent the lower face of said supporting block, to support on their upper faces a perforated sealing member through which the free ends of a looped strand are to be threaded and rethreaded, means to move said arms into and out of sidewise contact with each other, guiding and feeding means carried on the lower face of said block to thread the free ends of the looped strand through the perforated sealing member, two coaxial reversing rollers to engage the strand carried by the block at its lower face, means to simultaneously rotate said reversing rollers in opposite directions with respect to each other, segmental-shape guides, having upper and lower guideways, on the arms to surround said reversing rollers when the arms are moved into contact with each other, and inclined guides on the lower face of said block to direct one free end of said threaded strand from said sealing member toward one of said guideways and from the latter back toward the sealing member and to direct the other free end of said threaded strand away from said sealing member toward the other of said guideways and from the latter back toward the sealing member, to thereby rethread said free ends through the perforated sealing member.

7. In a threading machine in which a looped strand of flexible material is to be threaded through a perforated sealing member, a supporting block, a pair of arms movably supported alongside of each other on the lower face of said supporting block, means to move said arms into and out of sidewise contact with each other, a chute, extending from the upper surface of said block to the lower face thereof, for the reception of sealing members, means controlled by the movement of one of said arms toward the other to place a sealing member from said chute in a threading position straddling said arms, and means carried by the lower face of said supporting block to feed a strand through the perforated sealing member.

8. In a threading machine, a supporting block, a pair of arms, movably arranged alongside of each other adjacent the lower face of said block to support, when brought together, a perforated sealing member, through which the free ends of a looped strand are to be threaded to form a threaded seal assemblage, and, when separated, to discharge the threaded seal assemblage, and means to thread the free ends of a looped strand through the perforated sealing member while the latter is supported on said arms.

9. In a threading machine, a supporting block, a pair of arms, movably arranged alongside of each other adjacent the lower face of said block to support, when brought together, a perforated sealing member, through which the free ends of a looped strand are to be threaded to form a threaded seal assemblage, and, when separated, to discharge the threaded seal assemblage, an ejector to engage the threaded seal assemblage when the arms move away from each other, and means to thread the free ends of a looped strand through the perforated sealing member while the latter is supported on said arms.

10. In a threading machine, means to support in spaced relation two perforated sealing members through which a looped double-end strand is to be threaded and rethreaded, feeding and guiding means, arranged adjacent one end of one of said sealing members in threading position, to thread the free ends of the looped strand through said sealing members, a combined reversing and rethreading device, arranged adjacent the other end of said other sealing member in threading position, including feeding and guiding means to reverse the direction of travel of said free ends of the threaded strand to thereby form two reverse loops the free ends of which point back toward the sealing members and to rethread said free ends through the perforated sealing members, and guides intermediate the two sealing members to direct the free ends of the strand when passing in either direction between the two sealing members.

11. In a threading machine, a supporting block having two chutes extending therethrough from top to bottom, a pair of arms, arranged alongside of each other adjacent the lower face of said supporting block, to support a plurality of perforated sealing members in spaced relation supplied through said chutes, and means to thread the free ends of a looped strand through said perforated sealing members while they are supported by said arms.

12. In a threading machine, feeding rollers and a reciprocatory carriage to act upon a looped strand to be threaded through a perforated sealing member, an oscillatory gear sector and a train of gears to drive the feeding rollers alternatively in opposite directions, a shaft, and means, carried by the shaft, and connections to oscillate said gear sector and to reciprocate said carriage.

13. In a threading machine, feeding rollers and a reciprocatory carriage to act upon a looped strand to be threaded through a perforated sealing member, a pair of intermittently operating strand supply rollers to feed a strand to be acted upon by said feed rollers and carrier, an oscillatory gear sector and a train of gears to drive the feeding rollers alternatively in opposite directions, a shaft, means, carried by the shaft, and connections to oscillate said gear sector and to reciprocate said carriage, and a gear sector mounted to rotate with said shaft and a train of gears to intermittently rotate the strand supply rollers.

JOHN M. HOTHERSALL.